(12) United States Patent
Cheng et al.

(10) Patent No.: US 11,539,795 B2
(45) Date of Patent: Dec. 27, 2022

(54) NETWORK CONTROLLED SENSOR INFORMATION SHARING BETWEEN VEHICLES

(71) Applicant: QUALCOMM Incorporated, San Diego, CA (US)

(72) Inventors: Hong Cheng, Bridgewater, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 16/528,178

(22) Filed: Jul. 31, 2019

(65) Prior Publication Data

US 2020/0084278 A1    Mar. 12, 2020

Related U.S. Application Data

(60) Provisional application No. 62/728,006, filed on Sep. 6, 2018.

(51) Int. Cl.
| | |
|---|---|
| *H04L 67/12* | (2022.01) |
| *H04W 4/46* | (2018.01) |
| *H04W 4/44* | (2018.01) |
| *H04L 43/18* | (2022.01) |
| *H04W 4/06* | (2009.01) |

(52) U.S. Cl.
CPC .............. *H04L 67/12* (2013.01); *H04L 43/18* (2013.01); *H04W 4/06* (2013.01); *H04W 4/44* (2018.02); *H04W 4/46* (2018.02)

(58) Field of Classification Search
CPC .......... H04L 67/12; H04L 43/18; H04W 4/46; H04W 4/44; H04W 4/06
See application file for complete search history.

(56) References Cited

U.S. PATENT DOCUMENTS

| | | | |
|---|---|---|---|
| 9,161,167 B2 | 10/2015 | Aldana et al. | |
| 2002/0123361 A1* | 9/2002 | Bae | H04L 67/00 455/517 |
| 2014/0009275 A1 | 1/2014 | Bowers et al. | |
| 2018/0090009 A1 | 3/2018 | Roessler et al. | |
| 2018/0167370 A1* | 6/2018 | Frahim | H04L 63/102 |

(Continued)

FOREIGN PATENT DOCUMENTS

| | | |
|---|---|---|
| CN | 102057706 A | 5/2011 |
| CN | 103116912 A | 5/2013 |
| CN | 105849790 A | 8/2016 |

(Continued)

OTHER PUBLICATIONS

International Search Report and Written Opinion—PCT/US2019/044653—ISA/EPO—dated Oct. 4, 2019.

*Primary Examiner* — Brian Whipple
(74) *Attorney, Agent, or Firm* — Patterson & Sheridan, LLP

(57) ABSTRACT

Certain aspects of the present disclosure provide techniques relating to network controlled sensor information sharing between vehicles. In one embodiment, a method of wireless communications by a network entity comprises receiving a request, from a first user equipment (UE), for sharing of sensor information by at least a second UE based on a target region indicated by the request and taking one or more actions, in response to the request, to trigger the sharing of sensor information by the second UE.

39 Claims, 16 Drawing Sheets

(56) References Cited

U.S. PATENT DOCUMENTS

| | | |
|---|---|---|
| 2018/0218607 A1 | 8/2018 | Baghel et al. |
| 2019/0090099 A1 | 3/2019 | Wang et al. |

FOREIGN PATENT DOCUMENTS

| | | |
|---|---|---|
| CN | 107295470 A | 10/2017 |
| CN | 107948958 A | 4/2018 |
| CN | 107950039 A | 4/2018 |
| EP | 3170451 A1 | 5/2017 |
| TW | 201830985 A | 8/2018 |
| WO | 2014116698 A1 | 7/2014 |

\* cited by examiner

NETWORK CONTROLLED SENSOR INFORMATION SHARING BETWEEN VEHICLES

INTRODUCTION

This application claims priority to U.S. Application No. 62/728,006 filed Sep. 6, 2018, which is assigned to the assignee of the present application and is expressly incorporated by reference herein in its entirety.

FIELD OF THE DISCLOSURE

Aspects of the present disclosure relate to wireless communications, and more particularly, to techniques relating to network controlled sensor information sharing between vehicles.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation. However, as the demand for mobile broadband access continues to increase, there exists a need for further improvements in NR and LTE technology. Preferably, these improvements should be applicable to other multi-access technologies and the telecommunication standards that employ these technologies.

Such technologies have been applied to enable wireless communication services in vehicles (e.g., wagons, bicycles, motor vehicles (motorcycles, cars, trucks, buses), railed vehicles (trains, trams), watercraft (ships, boats), aircraft, spacecraft, etc.). In fact, a "connected vehicle" is already a mainstream reality. In some cases vehicles can communicate with each other, which is commonly referred to as vehicle to vehicle (V2V) communications. In such cases, V2V communications may involve sharing of sensor information (such as camera, radar, or other sensor information) between vehicles which may help promote safety or enhance traffic flow. The potentially high number of vehicles involved in V2V and the high mobility of such vehicles presents challenges.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a network entity. The method generally includes receiving a request, from a first user equipment (UE), for sharing of sensor information by at least a second UE based on a target region. The method also includes taking one or more actions, in response to the request, to trigger the sharing of sensor information by the second UE.

Certain aspects provide a method for wireless communication performed by a first user equipment (UE). The method generally includes transmitting a request to a network entity to request a sharing of sensor information by at least a second UE based on a target region indicated by the request and receiving sensory information from the second UE.

Certain aspects provide a method for wireless communication performed by a second user equipment (UE). The method generally includes receiving a message indicating a request by a first UE for a sharing of sensor information, the message comprising one or more criteria. The method further includes determining that the second UE is a match for the one or more criteria. The method further includes transmitting sensor information to the first UE based on the one or more criteria.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
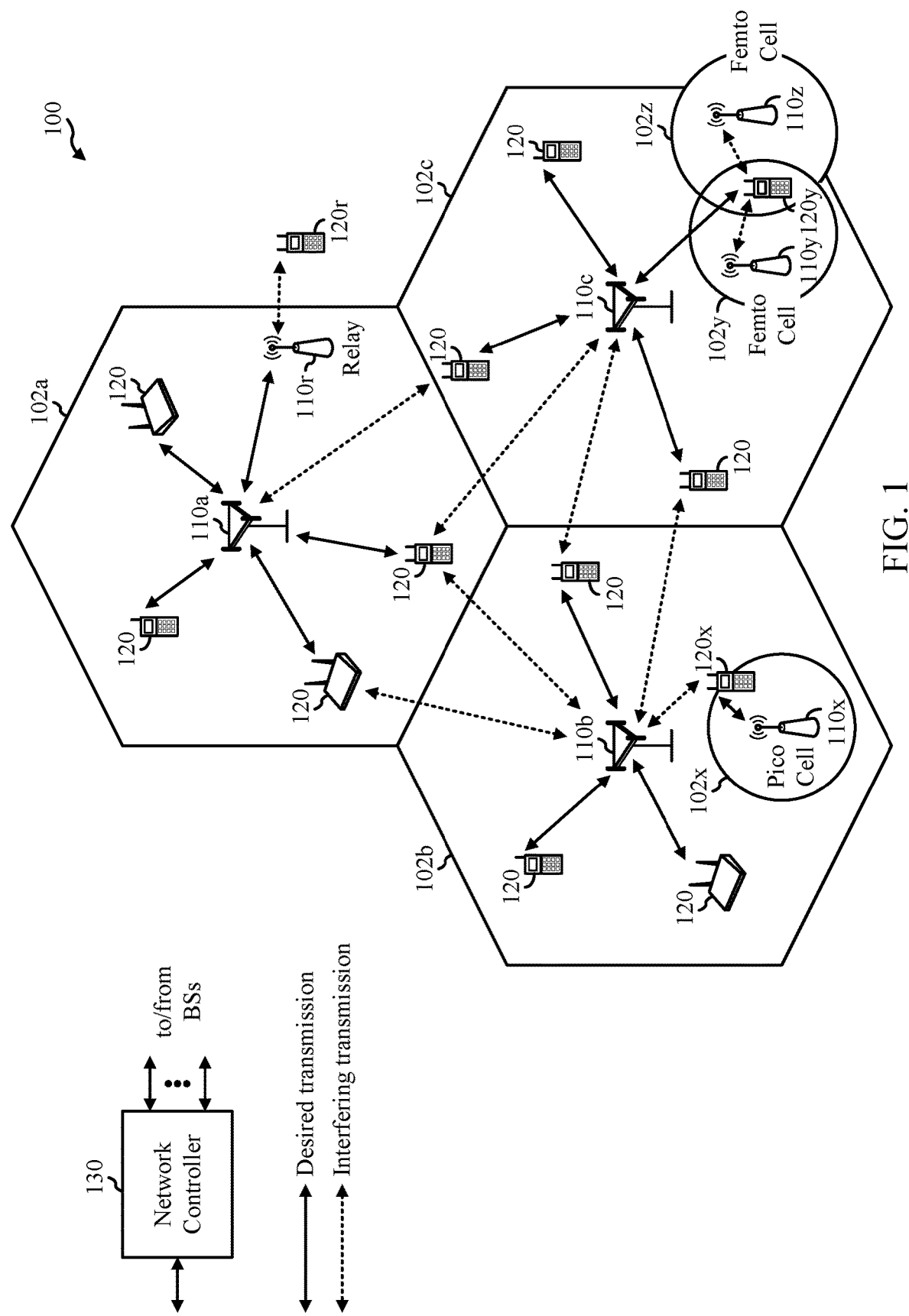
FIG. 1 is a block diagram conceptually illustrating an example telecommunications system, in accordance with certain aspects of the present disclosure.

Aspects of the present disclosure provide apparatus, methods, processing systems, and computer readable mediums relating to wireless communications between vehicles. As will be described in greater detail below, certain aspects described herein relate to enabling a network controlled sensor information sharing between vehicles, such as V2X vehicles. In certain aspects, the network controlled sensor information sharing comprises an on-demand network initiated query mechanism that can target a specific geographical area for identifying and triggering one or more second vehicles to share sensor information with a first vehicle. In certain aspects, the on-demand network initiated query mechanism is itself triggered by a sensor sharing request transmitted by a first vehicle (e.g., vehicle A), which may benefit from sensor information provided by the one or more second vehicles.

The sensor sharing request may include criteria that define what information the first vehicle is specifically looking for. For example, the criteria may include a request that sensor information (e.g., video or radar feed) about any objects detected in a certain location (e.g., 50 meters away from vehicle A) from a certain viewing angle (e.g., the angle from which vehicle A's view is blocked) be generated and transmitted to vehicle A. In certain aspects, the sensor sharing request is received by a core network (e.g., through a V2X App Server) that broadcasts the sensor sharing request in the specific geographical area, thereby, triggering a second vehicle (e.g., a second vehicle in IDLE mode) of the one or more second vehicles to provide the requested information.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g.,25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the components of UE 120 of FIG. 1 may perform operations 900 of FIG. 9 or operations 1000 of FIG. 1000.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110$r$ may communicate with the BS 110$a$ and a UE 120$r$ in order to facilitate communication between the BS 110$a$ and the UE 120$r$. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., abase station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
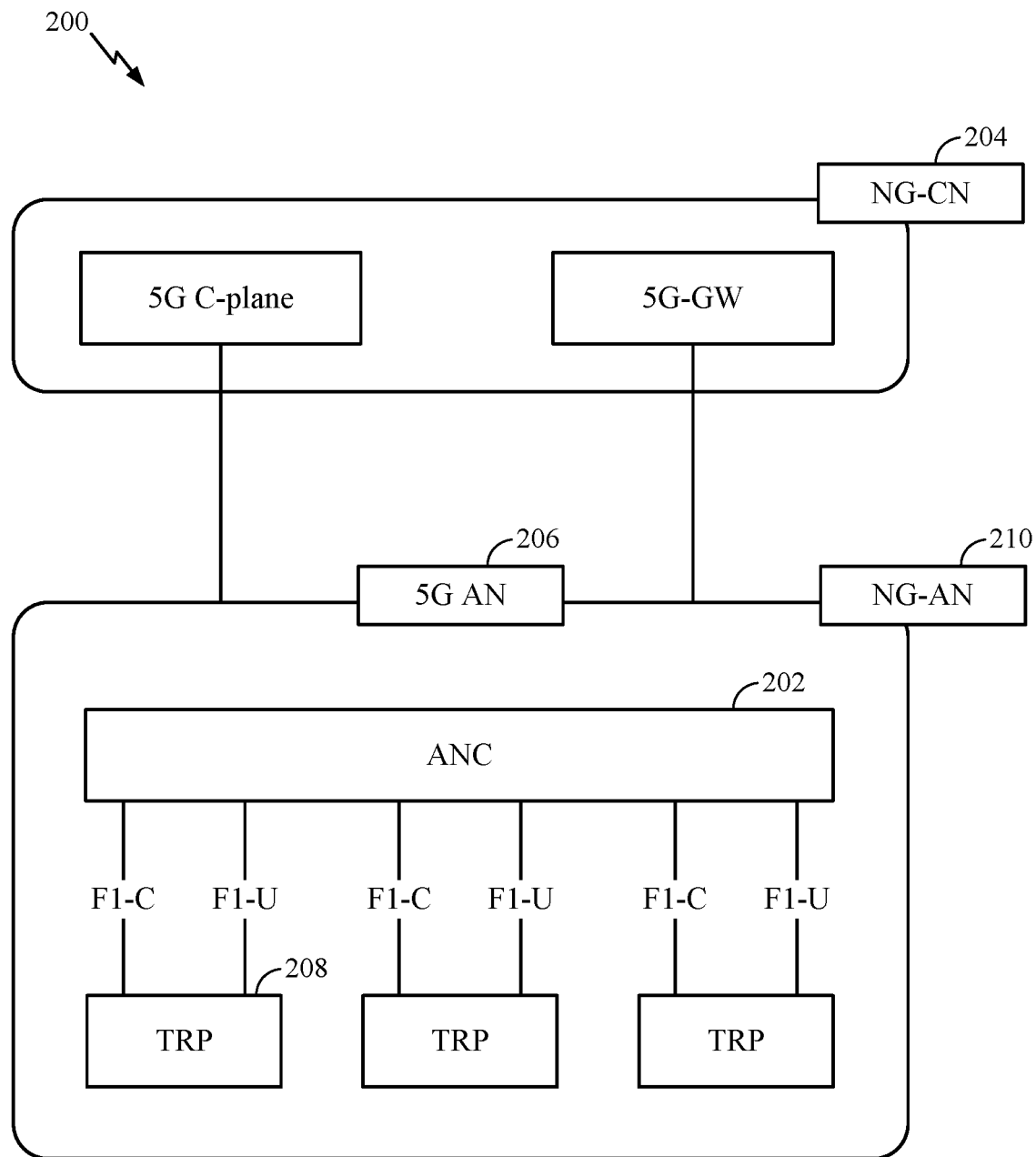
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.). Next Generation Core Network (NG-CN) 204 may perform operations 800 of FIG. 8. Also, although FIG. 2 illustrates a logical architecture of a 5G RAN, in certain aspects, RAN 200 may conform to the LTE technologies, in which case the core network (e.g., NG-CN 2040) may be an LTE CN. In such aspects, the LTE CN may operations 800 of FIG. 8.

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
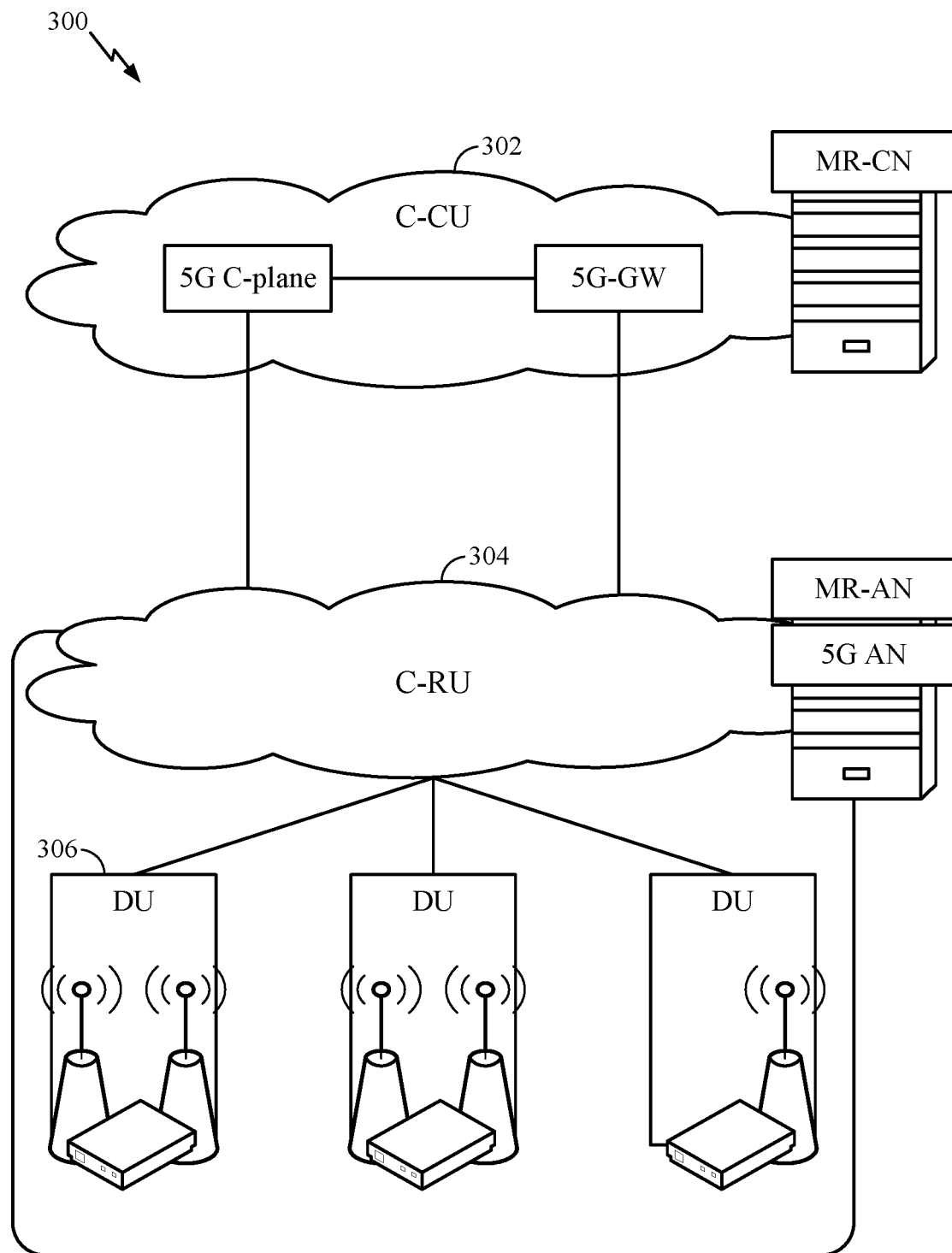
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity. C-CU 302 may perform operations 800 of FIG. 8.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
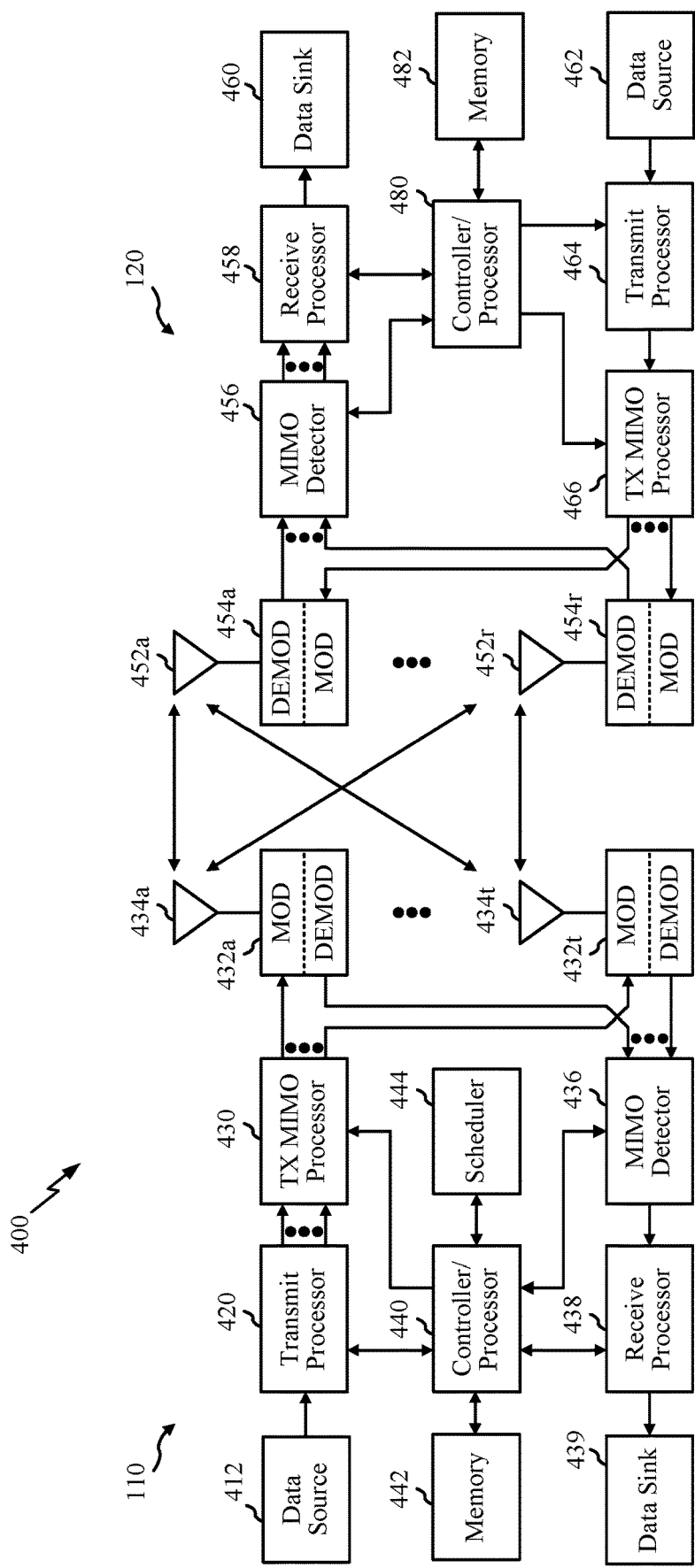
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to enable/perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. Also, the processor 480 and/or other processors and modules at the UE 120 may perform or direct the execution of processes for the techniques described herein (e.g., operations 900 of FIG. 9 and/or operations 1000 of FIG. 10). The memories 442 and 482 may store data and program codes for BS 110 and UE 120, respectively. A scheduler 444 may schedule UEs for data transmission on the downlink and/or uplink.

Figure 5:
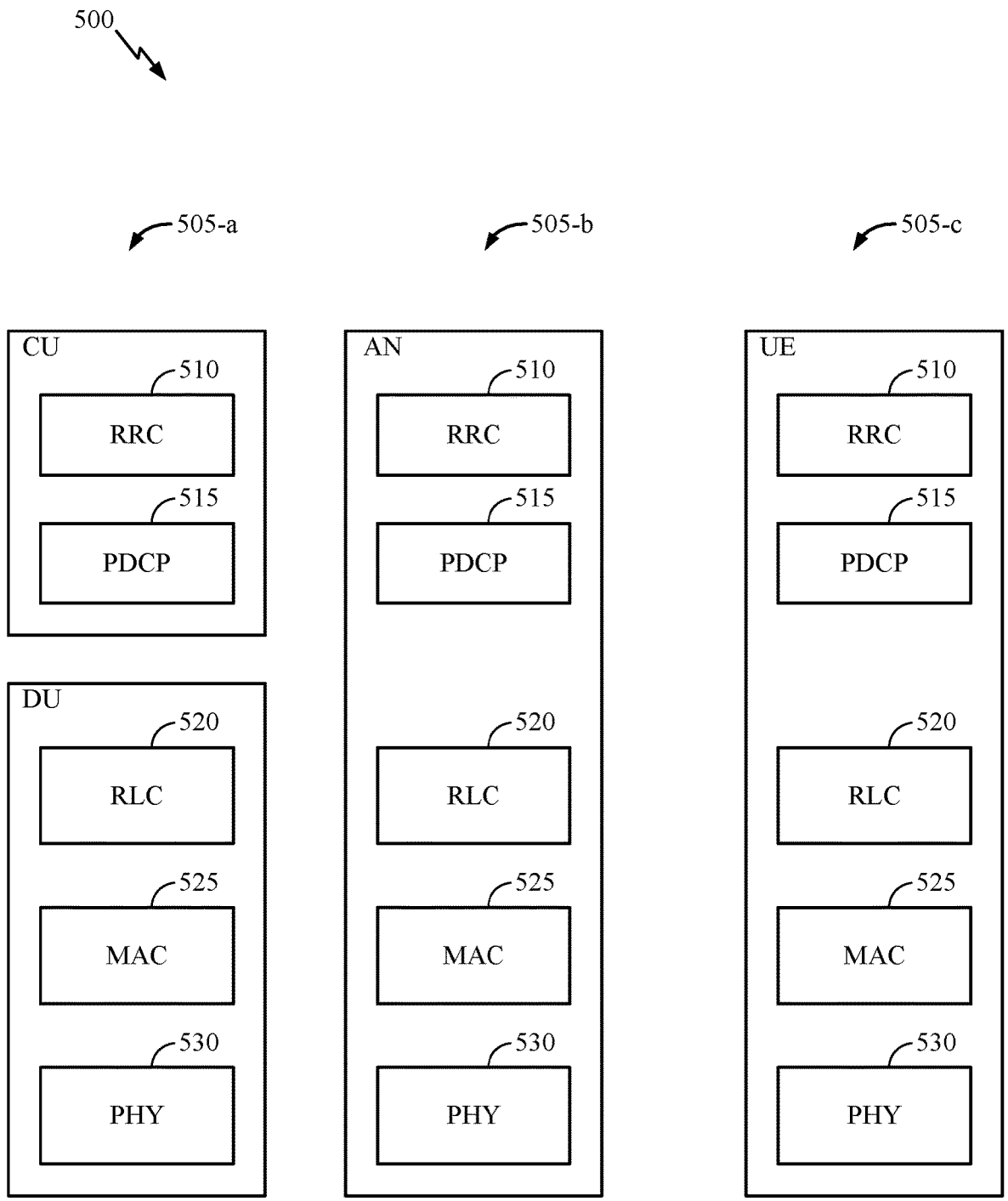
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
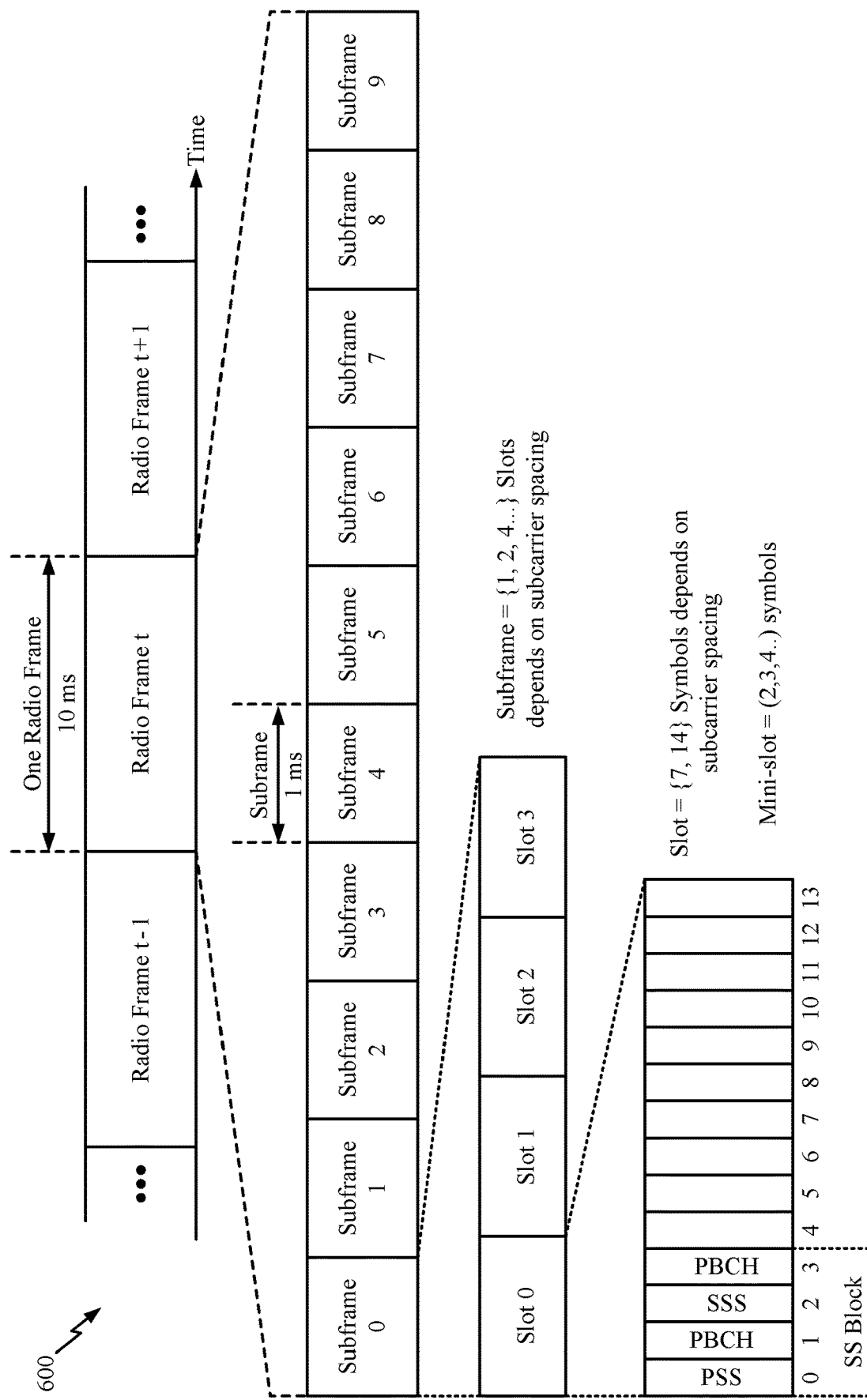
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example of Wireless Communications Between Vehicles

As discussed, wireless communication technologies have been applied to enable wireless communication services in vehicles. For example, a type of wireless communication, referred to as vehicle-to-everything (V2X) communication, refers to the communication of information from a vehicle to any entity and vice versa. V2X communication may comprise other more specific types of vehicular communication, such as vehicle-to-infrastructure (V2I), vehicle-to-vehicle (V2V), vehicle-to-pedestrian (V2P), vehicle-to-device (V2D), and vehicle-to-grid (vehicle-to-grid). Vehicles that support V2X communication may be referred to as V2X-enabled vehicles or V2X vehicles. A V2X vehicle is able to share information about itself, such as its presence, location, direction, speed, etc. with other V2X vehicles. Such communications between V2X vehicles increases safety and efficiency by allowing the V2X vehicles to coordinate and plan driving paths along roadways/streets. For example, V2X vehicles may be autonomous or semi-autonomous vehicles that use communications with other V2X vehicles to adapt how they drive/control movement of the V2X vehicle (e.g., accelerate, decelerate, brake, turn, etc.).

For example, when a V2X vehicle is not able to observe its surrounding environment using its sensors, it may benefit from sensor information that is shared by other V2X vehicles. More specifically, a V2X vehicle may be equipped with one or more sensors (e.g., radar, camera, light detection and ranging (LIDAR), etc.) to detect objects, other vehicles, or to generally determine surrounding information about its environment. In some cases, information relating to the V2X vehicle's surrounding may not be available through the V2X vehicle's own sensors. This is because, in one example, the sensors may be blocked by an object, such as another vehicle. In another example, the V2X vehicle may benefit from obtaining information relating to a certain area that is outside of the range within which its sensors are able to operate or sense objects, etc.

Generally, connectivity between connected vehicles is limited to the vehicles' Uu links. A Uu link of a device refers to the device's connection or link with the BS. For example, when two vehicles communicate through the Uu interface, the data is always traversing the base station (e.g., uplink/downlink communication) and the core network. V2X vehicles may also be able to communicate with each other directly using their PC5 capabilities. PC5 is an interface that allows V2X vehicles to communicate directly, such that the communication does not need to go through the BS (e.g., side-link communication). However, depending on the regional regulation and spectrum allocations, V2X vehicles' side-link communication through the PC5 interface may be limited to only certain types of applications such as the transmission of safety messages. In some other cases, a V2X vehicle may not be equipped with PC5 communication capabilities due to regional regulations.

In order to allow vehicles to share sensor info, in some cases, the vehicle that is generating the sensor information (interchangeably referred to as "Vehicle B" or the "second vehicle") may be configured to continuously send the sensor info to an application server connected to the core network, such as a V2X App Server, which aggregates the information, and shares it with other vehicles. However, this places an enormous burden on the network, as the sensor data could grow beyond the network's capability, and not all of the sensor information that is aggregated by the V2X App Server may be required or useful.

In some other cases, a vehicle may try to directly request on-demand sensor sharing (interchangeably referred to as "Vehicle A" or the "first vehicle") from the second vehicle via Uu, but that is not possible in some situations based on the current V2X communication framework. As an example, when the second vehicle is not actively connected to the V2X app server, the first vehicle is not able to identify the second vehicle. This is because when the second vehicle is, for example, in an idle mode, the location of the second vehicle is not even known to the network. In addition, the first vehicle may not be able to determine the identity or address of the second vehicle.

Figure 7:
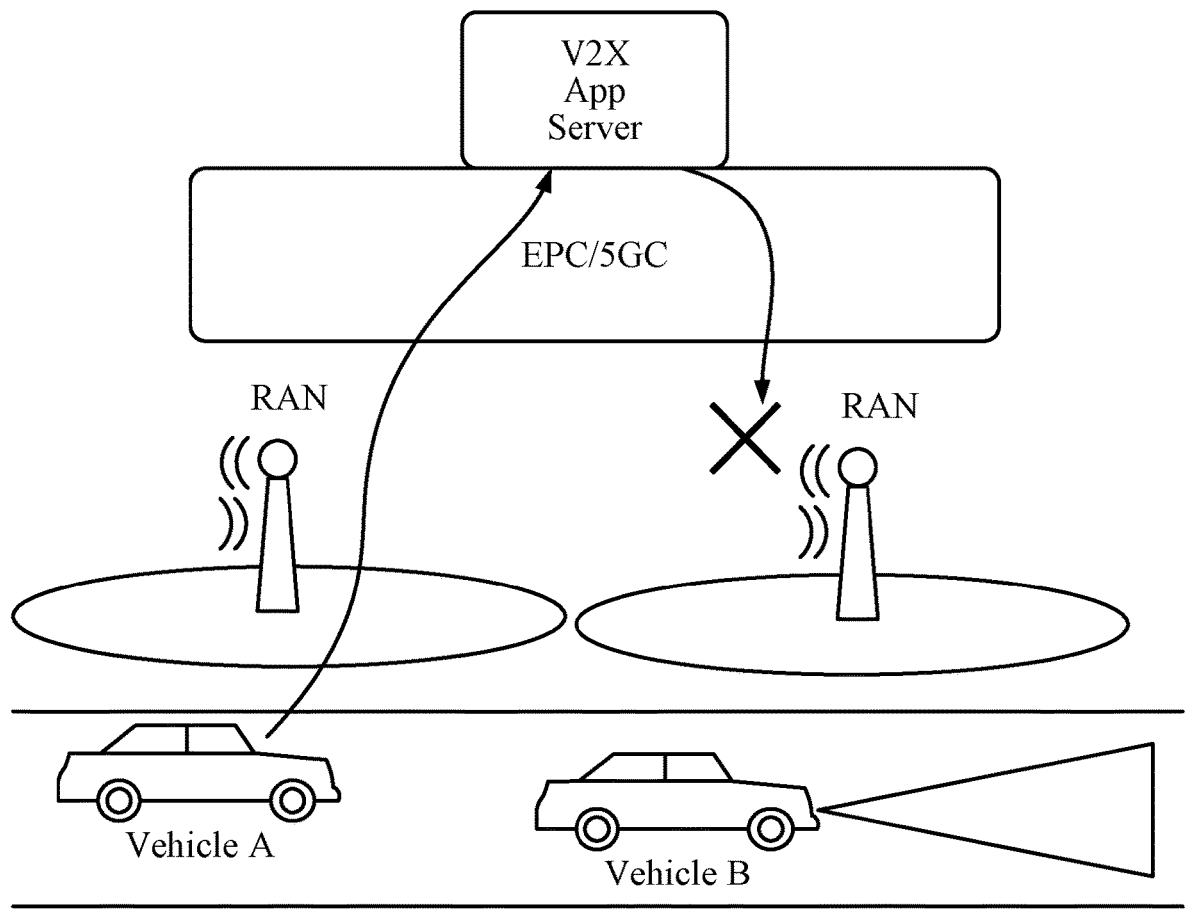
FIG. 7 illustrates vehicle A and vehicle B as well as a core network, in accordance with certain aspects of the present disclosure.

FIG. 7 shows an example of vehicle A attempting to request and receive sensor info from vehicle B but because vehicle B is not connected to the V2X application server, vehicle A is not able to identify vehicle B and, therefore, a connection cannot be established. In addition, the first vehicle and the second vehicle may not be able to achieve certain sensor sharing delay/data rate requirements if they are not linked and do not have a localized PDN connection or PDU session.

Accordingly, certain aspects described herein relate to enabling a network controlled sensor information sharing between vehicles, such as V2X vehicles. In certain aspects, the network controlled sensor information sharing comprises an on-demand network initiated query mechanism that can target a specific geographical area for identifying and triggering one or more second vehicles to share sensor information with one or more first vehicles.

Figure 8:
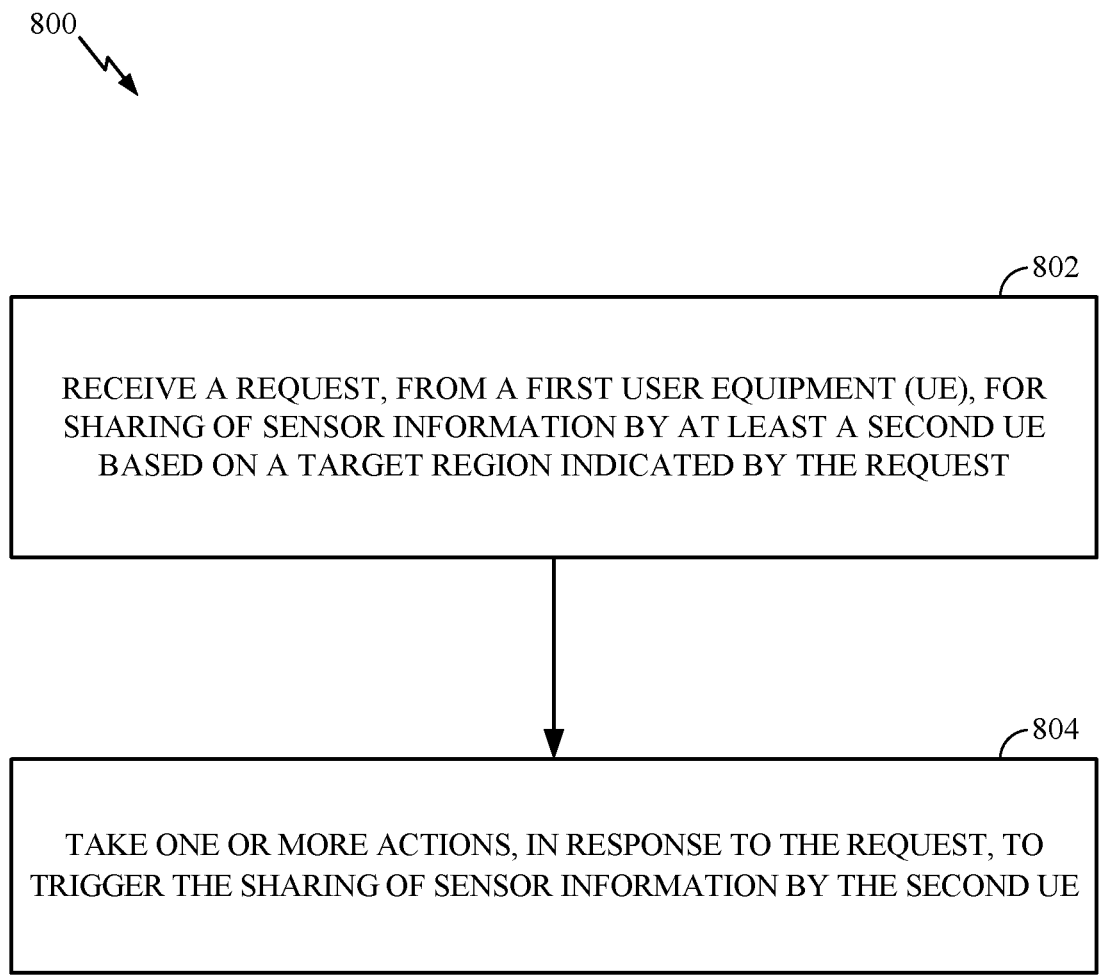
FIG. 8 illustrates example operations for wireless communications by a network entity, in accordance with certain aspects of the present disclosure.

FIG. 8 illustrates example operations 800 for wireless communications by a network entity, according to aspects of the present disclosure. Operations 800 begin, at 802, by receiving a request, from a first user equipment (UE), for sharing of sensor information by at least a second UE in a target region. At 804, operations 800 continue by taking one or more actions, in response to the request, to trigger the sharing of sensor information by the second UE.

Figure 9:
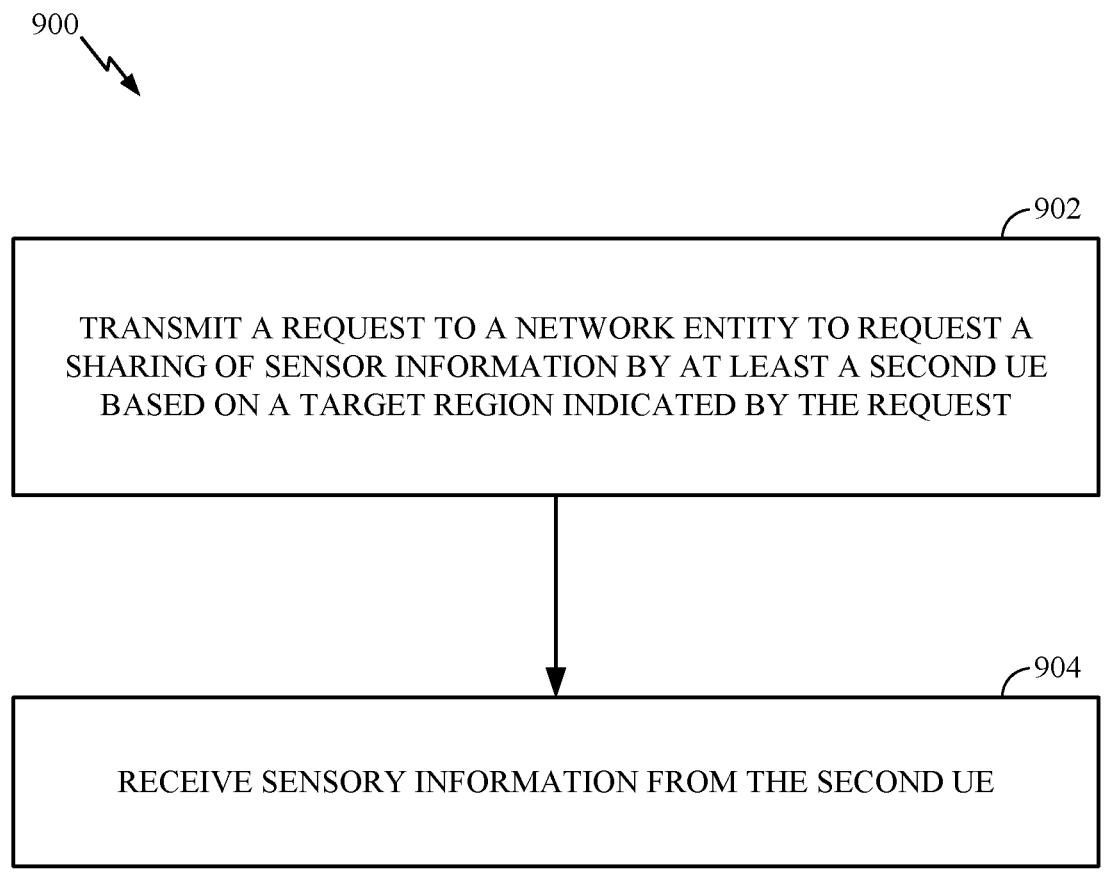
FIG. 9 illustrates example operations for wireless communications by a first UE, in accordance with certain aspects of the present disclosure.

FIG. 9 illustrates example operations 900 for wireless communications by a first UE (e.g., UE 120, vehicle A), according to aspects of the present disclosure. Operations 900 begin, at 902, by transmitting a request to a network entity to request a sharing of sensor information by at least a second UE based on a target region indicated by the request. At 904, operations 900 continue by receiving sensory information from the second UE.

Figure 10:
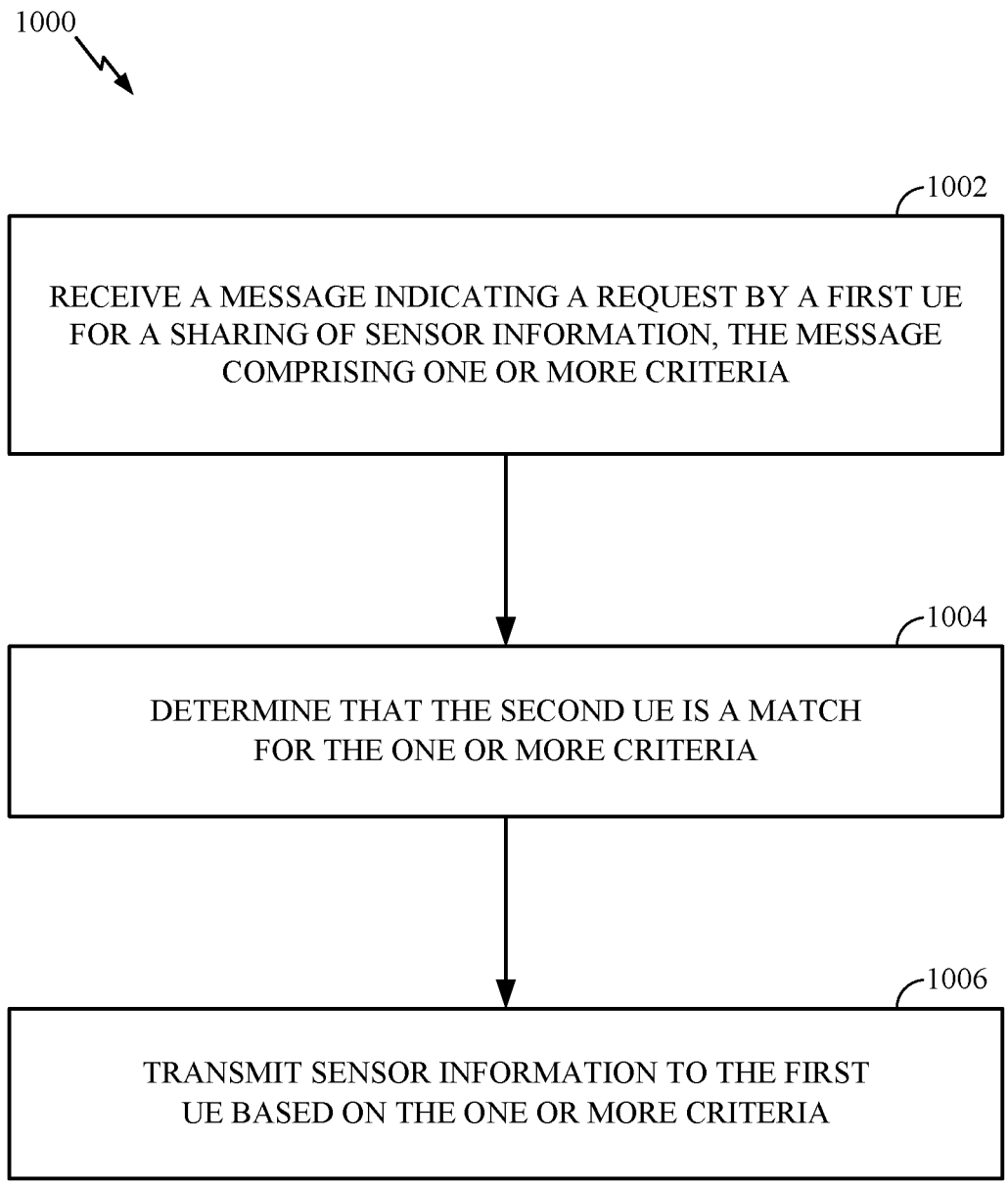
FIG. 10 illustrates example operations for wireless communications by a second UE, in accordance with certain aspects of the present disclosure.

FIG. 10 illustrates example operations 1000 for wireless communications by a second UE (e.g., UE 120, vehicle B), according to aspects of the present disclosure. Operations 1000 begin, at 1002, by receiving a message indicating a request by a first UE for a sharing of sensor information, the message comprising one or more criteria. At 1004, operations 1000 continue by determining that the second UE is a match for the one or more criteria. At 1006, operations 1000 continue by transmitting sensor information to the first UE based on the one or more criteria.

Figure 11:
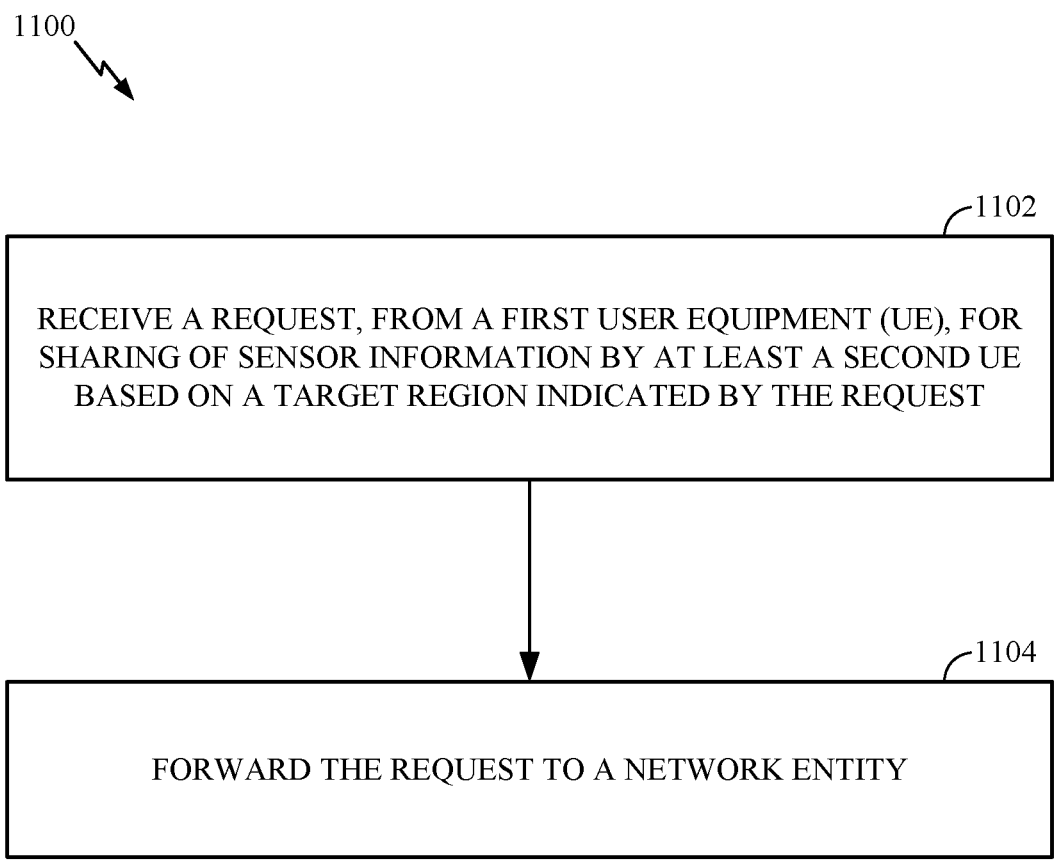
FIG. 11 illustrates example operations for wireless communications by an entity, in accordance with certain aspects of the present disclosure.

FIG. 11 illustrates example operations 1100 for wireless communications by an entity (e.g., entity 1208 of FIG. 12), according to aspects of the present disclosure. Operations 1100 begin, at 1102, by receiving a request, from a first user equipment (UE), for sharing of sensor information by at least a second UE based on a target region indicated by the request. At 1104, operations 1100 continue by forwarding the request to a network entity. In certain aspects, entity 1208 is a V2X application server.

Figure 12:
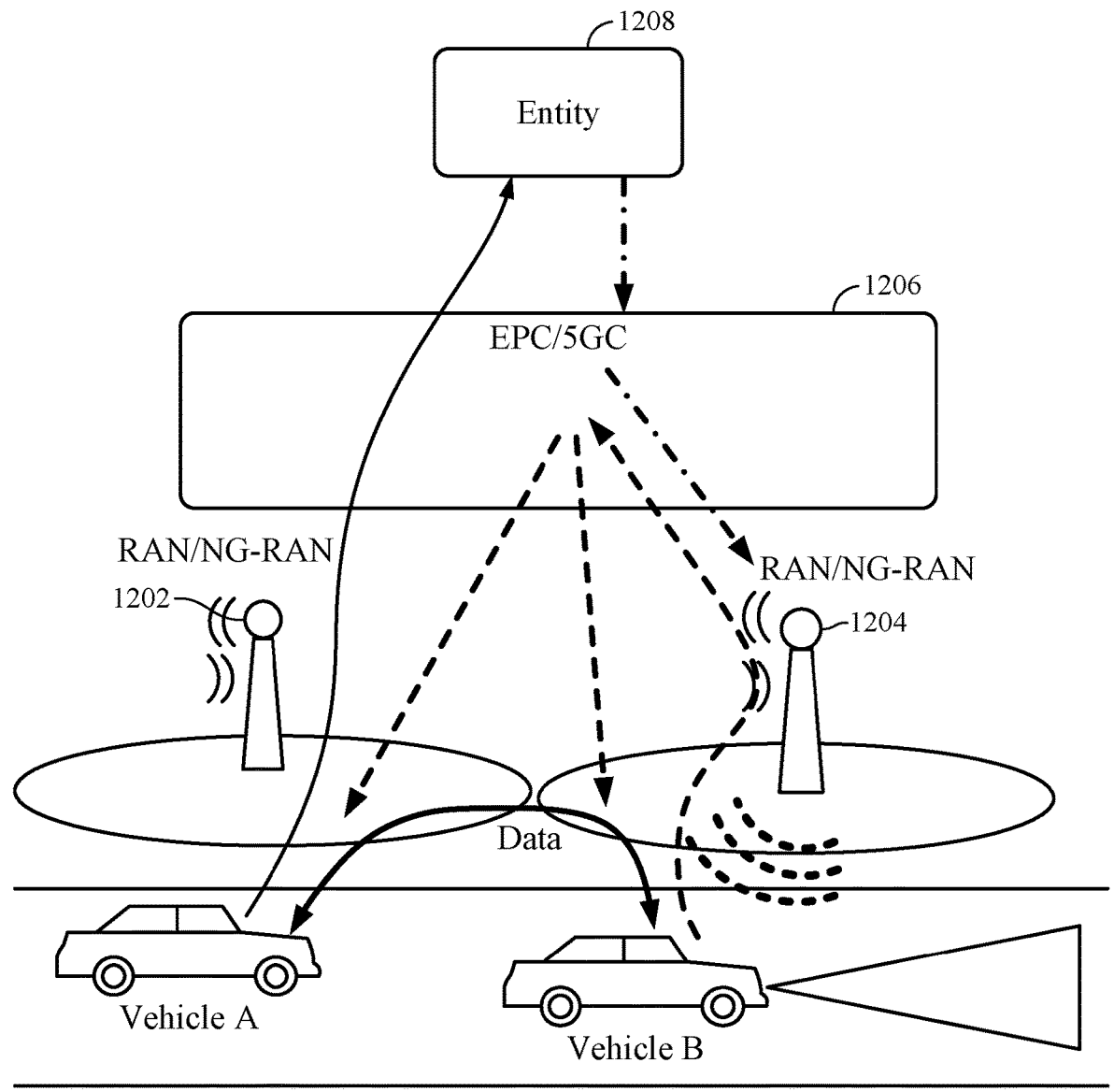
FIG. 12 illustrates vehicle A and vehicle B as well as a network entity, in accordance with certain aspects of the present disclosure.

FIG. 12 illustrates two vehicles, vehicle A and vehicle B, two base stations 1202 and 1204, a core network 1206 and an entity 1208. Core network 1206 (which may also be referred to as a network entity) may conform to any radio access technology. In one example, core network 1206 may conform to the evolved packet system (EPS) technologies (e.g., where the RAN is LTE), in which case core network 1206 is an Evolved Packet Core (EPC) network. In another example, core network 1206 may conform to the 5G/NR technologies, in which case core network 1206 is a 5G core (5GC) network.

Core network 1206 may communicate with base stations 1202 and 1204 using radio access networks that may use a certain radio access technology. For example, BSs 1202 and 1204 may be gNBs that communicate with 5GC core network 1206 using a RAN (may also be referred to as NG-RAN) that conforms to the 5G/NR technologies. In another example, BSs 1202 and 1204 may be eNBs that communicate with EPC core network 1206 using a RAN that conforms to the LTE technologies. In some aspects, core network 1206 and BSs 1120 and 1204 may be configured to conform to both the LTE and 5G/NR technologies. Entity 1208 may refer to an entity that is running outside or within core network 1206 and, among other things, is able to receive uplink data from a vehicle (i.e., a user equipment (UE)) and relay that data to one or more entities within core network 1206 and vice versa. In one example, entity 1208 may be a V2X application server.

As described above, in certain embodiments, a vehicle may benefit from sensor information generated by other vehicles. For example, vehicle A's view of its surroundings may be partially or fully blocked by one or more vehicles in front of it. In such an example, vehicle A may detect an object in a certain location but since its view is blocked, it may benefit from other vehicles confirming that the object exists in that location. In other examples, vehicle A may generally benefit from receiving sensor information about objects that exist in front of the vehicles that are blocking vehicle A's view or, in another example, vehicle A may benefit from receiving sensor information about objects that can be detected by other vehicles (e.g., second vehicle) beyond a certain distance (e.g., 50 meters) from vehicle A. In these examples, vehicle A may initiate a request with some criteria that define what information vehicle A is specifically looking for. For example, the criteria may include a request that sensor information (e.g., video or radar feed) about any objects detected in a certain location (e.g., 50 meters away from vehicle A) from a certain viewing angle (e.g., the angle from which vehicle A's view is blocked) be generated and transmitted to vehicle A.

As such, for any sensor information to be shared, in certain aspects, vehicle A may first determine if it benefits from receiving sensor information. If vehicle A determines that it does need sensor information, such as in the examples described above, vehicle A then transmits a sensor sharing request to entity 1208 operating outside or within core network 1206. In certain aspects, the request comprises one or more criteria or indications including the location of vehicle A, information relating to the sensor information requested, area of interest, perspective or viewing angle, and/or time.

Location of vehicle A (e.g., cell ID of the cell where vehicle A is located) may help entity 1208 and/or core network 1206 determine where to broadcast a message to trigger a sharing of sensor information by one or more other vehicles (e.g., vehicle B). For example, entity 1208 and/or core network 1206 may locate one or more cells to broadcast a message to trigger a sharing of sensor information based on the location of vehicle A. Information relating to the sensor information requested, in certain aspects, may include the type of sensor information that vehicle A is requesting (e.g., video or radar feed etc.).

The area of interest indicates an area that vehicle A is requesting information about. For example, vehicle A may indicate as one of the criteria that vehicle A needs sensor information about, for example, an area that is within 100 meters of vehicle A (e.g., a range or a radius of 100 meters). In certain aspects, the area of interest may be used by entity 1208 and/or core network 1206 to determine one or more cells to broadcast a message to trigger a sharing of sensor information.

The perspective or viewing angle indicates from what viewing angle sensor information should be gathered and shared from vehicle A. For example, if vehicle A is behind vehicle B, it may indicate a need for sensor information that is generated by vehicle B's front sensors, as one of the criteria. Therefore, based on the area of interest and the perspective criteria, vehicle B is able to determine what location and angle vehicle A needs information about. For example, the area of interest may indicate a radius of 100 meters and the viewing angle may indicate the certain angle (e.g., north-west of the 100-meter radius area) within the 100-meter radius, which vehicle A needs sensor information about. In another example, vehicle A may need to perform a left turn or right turn maneuver and, therefore sensor information about the target road section from the other vehicles or the road side units (RSUs) may be beneficial to vehicle A.

In certain aspects, the time may refer to the time when the request was issued by vehicle A. In certain aspects, the time may also refer to a time period indicating the amount of time during which vehicle A needs sensor data. For example, vehicle A may only need sensor data for 30 seconds after it issues the request. This ensures that the network is not burdened with an unnecessary amount of data that will not be used by the requester of the information after a certain point in time.

In addition to the criteria, in certain aspects, vehicle A may include connection information in the request. For example, the request may include information about the protocol data unit (PDU) session or the packet data network (PDN) connection of vehicle A with core network 1206. The PDU session configuration information or PDN connection configuration information may include information about the serving cell, the data network name (DNN) and/or the access point name (APN), a network slice info, and an IP address that can be used to route information to vehicle A. In certain aspects, the IP address may be a multicast IP address or a unicast IP address.

Having received the sensor sharing request from vehicle A, entity 1208 forwards the request to core network 1206 to broadcast a message to a target region to trigger the sharing of sensor information. In certain aspects, based on the location of vehicle A and/or the area of interest, entity 1208 may locate one or more cells in which the message should be broadcasted by core network 1206. In such aspects, the target region may refer to the one or more cells. For example, based on the location of vehicle A, entity 1208 may determine the cell ID of the cell where vehicle A is located. Further, entity 1208 may examine the area of interest indicated by the request received from vehicle A. In one example, if the area of interest, which may be indicated by a radius or a range, falls within the same cell that vehicle A is located in, then entity 1208 may forward vehicle A's request to core network 1206 to broadcast a message in a target region that is the cell where vehicle A is located in.

In one example, if the area of interest does not fall within the same cell that vehicle A is located in (e.g. vehicle A is requesting info about 1 kilometers ahead), then entity 1208 may locate one or more cells wherein vehicles may be able to provide the sensor info that vehicle A is requesting. In such an example, entity 1208 forwards vehicle A's request to core network 1206 to broadcast a message in a target region that includes the one or more cells located by entity 1208. When entity 1208 forwards the request to core network 1206, including a target region that refers to one or more cells, core network 1206 may still adjust the target region. For example, entity 1208 may indicate one or more 2G cells as the target region while core network 1206 may adjust those one or more 2G cells to LTE cells instead.

In some other aspects, entity 1208 may not perform the action of locating any cells itself and may instead indicate the location of vehicle A and/or the area of interest to core network 1206 for the core network to locate one or more cells to broadcast the message in. In such aspects, the target region may refer to the location of vehicle A (e.g., cell ID where vehicle A is in, or geolocation information about vehicle A) and the area of interest. Based on the location of vehicle A and the area of interest, core network 1206 is then able to locate one or more cells to broadcast the message in. Locating the one or more cells by core network 1206 may be performed similar to how network entity 1208 locates the one or more cell as described above.

In certain aspects, when core network 1206 conforms to the 5G/NR technologies, entity 1208 accesses core network 1206 via a network exposure function (NEF) to indicate to core network 1206 where the message should be broadcasted. NEF provides an interface that a 5GC core network 1206 may support to allow any external entities or internal network function to interact with core network 1206's entities, such as an access and mobility management function (AMF), or a session management function (SMF), etc. NEF further comprises some internal logic to instruct core network 1206 as to how the message should be broadcasted.

In certain aspects, when core network 1206 conforms to the 3GPP EPS (evolved packet system) technologies, entity 1208 (e.g., V2X App Server) may act as a group communication service enabler (GCSE server) and use a multimedia broadcast/multicast service (MBMS) mechanism to request broadcasting the request in a specific cell and/or location using xMB and/or MB2 reference points. In certain aspects, if MBMS is not supported by the network, entity 1208 may communicate with a Cell Broadcast Center to use the cell broadcast system (CBS) for sending the trigger. Note that, the MBMS mechanism described in the embodiments herein may use a single cell point to multipoint (SC-PTM) transmission.

After receiving the request from entity 1208 and also information about the target region, core network 1206 instructs RAN to broadcast a message in the one or more cells, that have been either located by entity 1208 or core network 1206 itself. In certain aspects, the message may indicate a reason for why the message is being broadcasted, which in this case, is a request for the sharing of sensor information. The message may also include the criteria indicated by the request generated by vehicle A. For example, the message may include the sensor info criteria received as part of the request from vehicle A. In certain aspects, the sensor info criteria may include a sensor ID, which may indicate the type of sensor information that vehicle A is requesting. For example, a certain sensor ID may indicate a video feed and another sensor ID may indicate a LADAR feed. In another example, a sensor ID may indicate a type of sensor whose sensor data vehicle A is able to process. For example, sensor ID may refer to sensors by a particular manufacturer. That is because vehicle A may only be able to process sensor data that is generated by sensors that are manufactured by that manufacturer. Alternatively, vehicle A may indicate the minimum performance requirements that the sensor should be able to meet, e.g. accuracy, confidence level, delay, etc.

In addition, the message may also indicate the time, as described above. Further, the message may also include the area of interest and/or viewing angle/perspective criteria, which would allow any vehicle receiving the message to determine what area and/or viewing angle to focus on when generating sensor info for vehicle A. In certain aspects, the message may also include the PDU session configuration information (or PDN connection configuration information) that was received as part of the request by vehicle A.

The core network 1206 then broadcasts the message in the one or more cells that have been located either by core network 1206 or the entity. In certain aspects, when core network 1206 conforms to the 3GPP EPS technologies, the MBMS mechanism or the CBS may be used to broadcast the message in the one or more cells. In certain aspects, when core network 1206 conforms to the 5G/NR technologies, the message may be aligned with the NG-RAN broadcast design of the 5G/NR technologies.

After the message is broadcasted in the one or more cells, a number of vehicles (e.g., which may be in idle mode) in the one or more cells may receive the message. For example, a vehicle in the one or more cells may receive the message and then determine if it matches the criteria indicated by the message. If it does not, the vehicle ignores the message. If it does, in certain aspects, it initiates a connection towards core network 1206. In certain aspects, the connection is set up using the PDU session (or PDN connection) of vehicle A (e.g., such that mobile edge computing can be used), so that traffic can be locally routed to vehicle A's PDN connection. In certain aspects, vehicle B's existing PDU session configuration (or PDN connection configuration) is re-written by the PDU session configuration information (or PDN connection configuration information) that is passed down by the message.

After vehicle B (e.g., vehicle that matched the criteria) initiates a connection towards core network 1206, core network 1206 instructs the RAN to establish a connection (e.g., a local breakout) for the sharing of sensor information locally (e.g., by establishing a connection to the same mobile edge computing platform). Subsequently, a connection is established based on the information included in the request from vehicle A (e.g., APN/DNN, slice info, serving cell info, the IP address that should be used to route information to vehicle A, etc.), allowing data from vehicle B to be transmitted to the IP address (e.g., multicast or unicast) provided by vehicle A. In certain aspects, this may be performed by connecting the PDU session (or PDN connection) of vehicle A and the PDU session (or PDN connection) of vehicle B with core network 1206 together. In certain aspects, the connection that is established for allowing vehicle B to share sensor information with vehicle A could be a local split of the connection the vehicle B initiates towards core network 1206.

In certain aspects, core network 1206 may optionally modify vehicle A's connection to connect vehicle A to vehicle B's connection.

Figure 13:
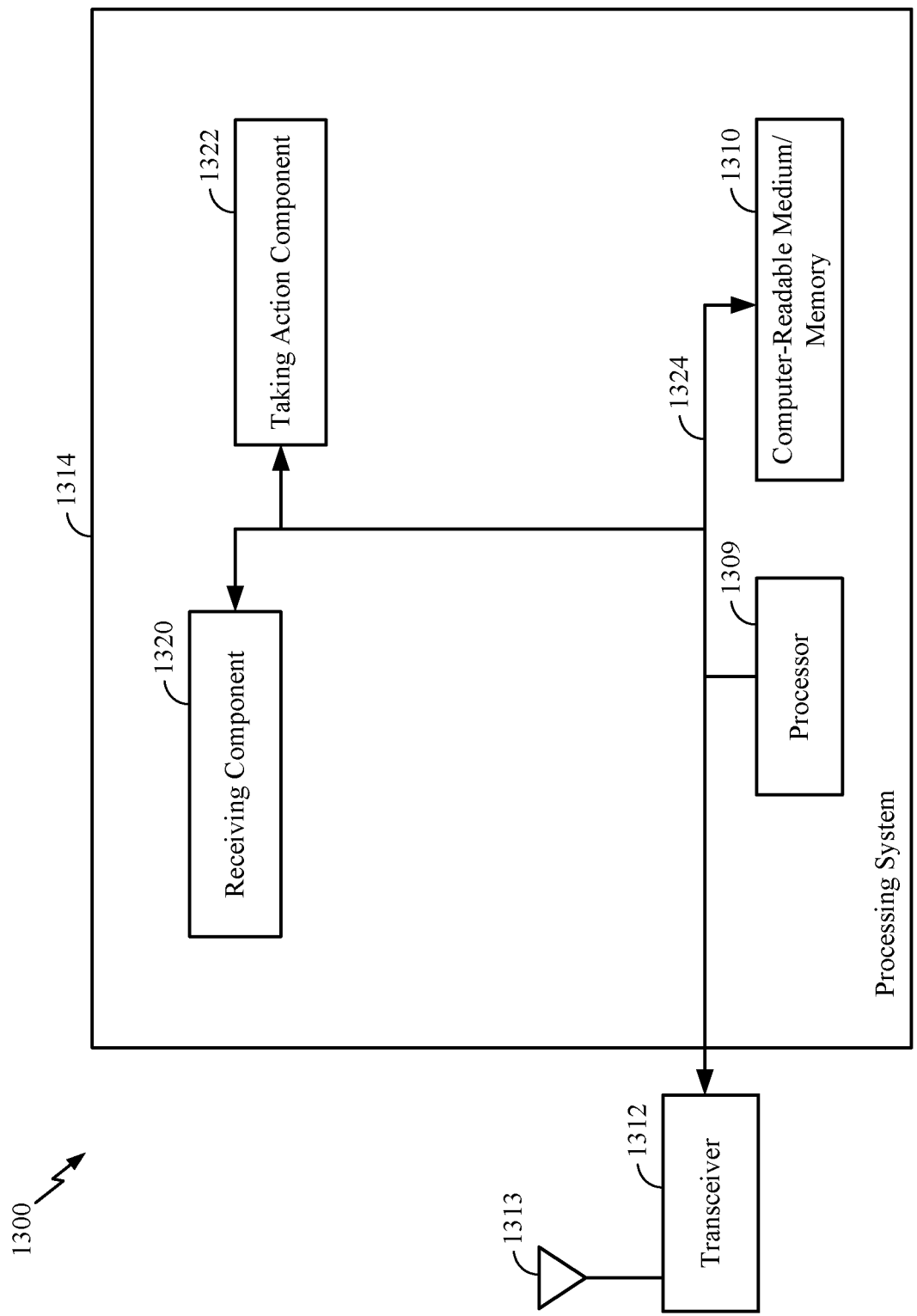
FIG. 13 illustrates a communications device that may include various components configured to perform operations for the techniques disclosed herein, such as one or more of the operations illustrated in FIG. 8.

FIG. 13 illustrates a wireless communications device 1300 (a network entity, such as core network 1206 of FIG. 12) that may include various components (e.g., corresponding to means-plus-function components) configured to perform operations for the techniques disclosed herein, such as one or more of the operations illustrated in FIG. 8. The communications device 1300 includes a processing system 1314 coupled to a transceiver 1312. The transceiver 1312 is configured to transmit and receive signals for the communications device 1300 via an antenna 1313. The processing system 1314 may be configured to perform processing functions for the communications device 1300, such as processing signals, etc.

The processing system 1314 includes a processor 1309 coupled to a computer-readable medium/memory 1310 via a bus 1324. In certain aspects, the computer-readable medium/memory 1310 is configured to store instructions that when executed by processor 1309, cause the processor 1309 to perform one or more of the operations illustrated in FIG. 8, or other operations for performing the various techniques discussed herein.

In certain aspects, the processing system 1314 further includes a receiving component 1320 for performing one or more of the operations illustrated at 802 in FIG. 8. Additionally, the processing system 1314 includes a taking action component 1322 for performing one or more of the operations illustrated at 804 in FIG. 8.

The receiving component 1320 and the taking action component 1322 may be coupled to the processor 1309 via bus 1324. In certain aspects, the receiving component 1320 and the taking action component 1322 may be hardware circuits. In certain aspects, the receiving component 1320 and the taking action component 1322 may be software components that are executed and run on processor 1309.

Figure 14:
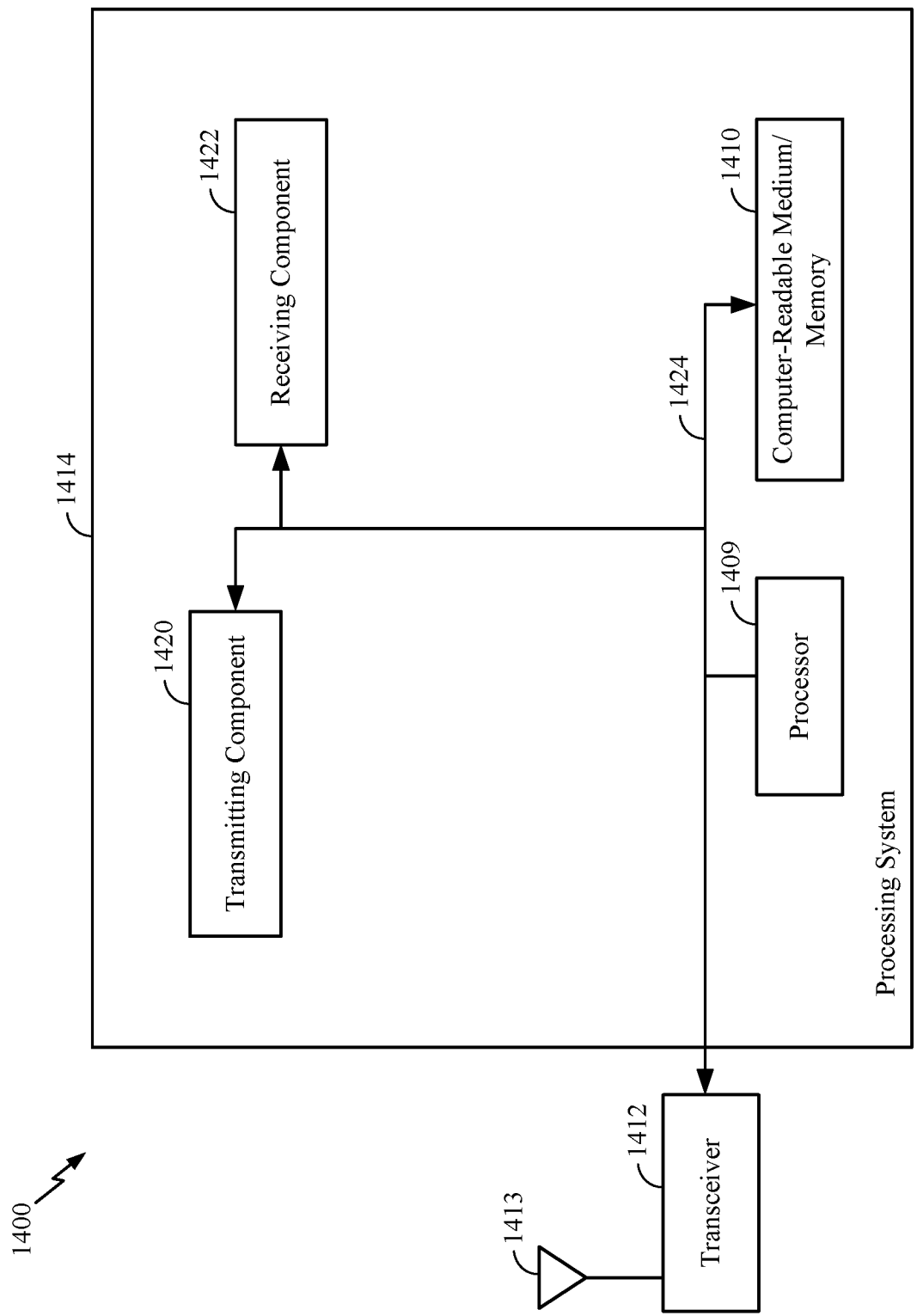
FIG. 14 illustrates a communications device that may include various components configured to perform operations for the techniques disclosed herein, such as one or more of the operations illustrated in FIG. 9.

FIG. 14 illustrates a wireless communications device 1400 (a first UE, such as UE 120, vehicle A of FIG. 12, etc.) that may include various components (e.g., corresponding to means-plus-function components) configured to perform operations for the techniques disclosed herein, such as one or more of the operations illustrated in FIG. 9. The communications device 1400 includes a processing system 1414 coupled to a transceiver 1412. The transceiver 1412 is configured to transmit and receive signals for the communications device 1400 via an antenna 1413. The processing system 1414 may be configured to perform processing functions for the communications device 1400, such as processing signals, etc.

The processing system 1414 includes a processor 1409 coupled to a computer-readable medium/memory 1410 via a bus 1424. In certain aspects, the computer-readable medium/memory 1410 is configured to store instructions that when executed by processor 1409, cause the processor 1409 to perform one or more of the operations illustrated in FIG. 9, or other operations for performing the various techniques discussed herein.

In certain aspects, the processing system 1414 further includes a transmitting component 1420 for performing one or more of the operations illustrated at 902 in FIG. 9. Additionally, the processing system 1414 includes a receiving component 1422 for performing one or more of the operations illustrated at 904 in FIG. 9.

The transmitting component 1420 and the receiving component 1422 may be coupled to the processor 1409 via bus 1424. In certain aspects, the transmitting component 1420 and the receiving component 1422 may be hardware circuits. In certain aspects, the transmitting component 1420 and the receiving component 1422 may be software components that are executed and run on processor 1409.

Figure 15:
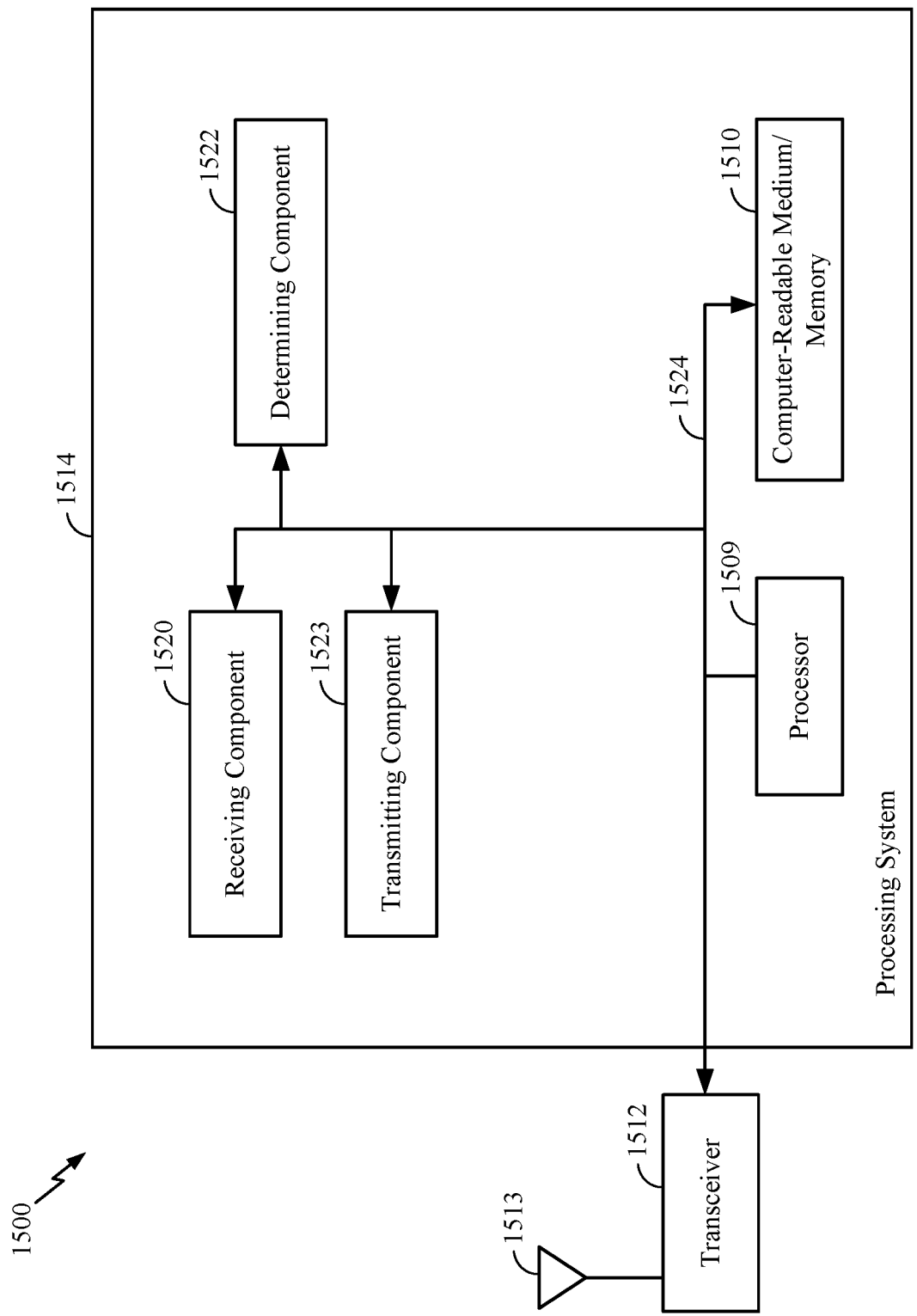
FIG. 15 illustrates a communications device that may include various components configured to perform opera-tions for the techniques disclosed herein, such as one or more of the operations illustrated in FIG. 10.

FIG. 15 illustrates a wireless communications device 1500 (a second UE, such as UE 120, vehicle B of FIG. 12, etc.) that may include various components (e.g., corresponding to means-plus-function components) configured to perform operations for the techniques disclosed herein, such as one or more of the operations illustrated in FIG. 10. The communications device 1500 includes a processing system 1514 coupled to a transceiver 1512. The transceiver 1512 is configured to transmit and receive signals for the communications device 1500 via an antenna 1513. The processing system 1514 may be configured to perform processing functions for the communications device 1500, such as processing signals, etc.

The processing system 1514 includes a processor 1509 coupled to a computer-readable medium/memory 1510 via a bus 1524. In certain aspects, the computer-readable medium/memory 1510 is configured to store instructions that when executed by processor 1509, cause the processor 1509 to perform one or more of the operations illustrated in FIG. 10, or other operations for performing the various techniques discussed herein.

In certain aspects, the processing system 1514 further includes a receiving component 1520 for performing one or more of the operations illustrated at 1002 in FIG. 10. Additionally, the processing system 1514 includes a determining component 1522 for performing one or more of the operations illustrated at 1004 in FIG. 10. Additionally, the processing system 1514 includes a transmitting component 1523 for performing one or more of the operations illustrated at 1006 in FIG. 10.

The receiving component 1520, the determining component 1522, and the transmitting component 1523 may be coupled to the processor 1509 via bus 1524. In certain aspects, the receiving component 1520, the determining component 1522, and the transmitting component 1523 may be hardware circuits. In certain aspects, the receiving component 1520, the determining component 1522, and the transmitting component 1523 may be software components that are executed and run on processor 1509.

Figure 16:
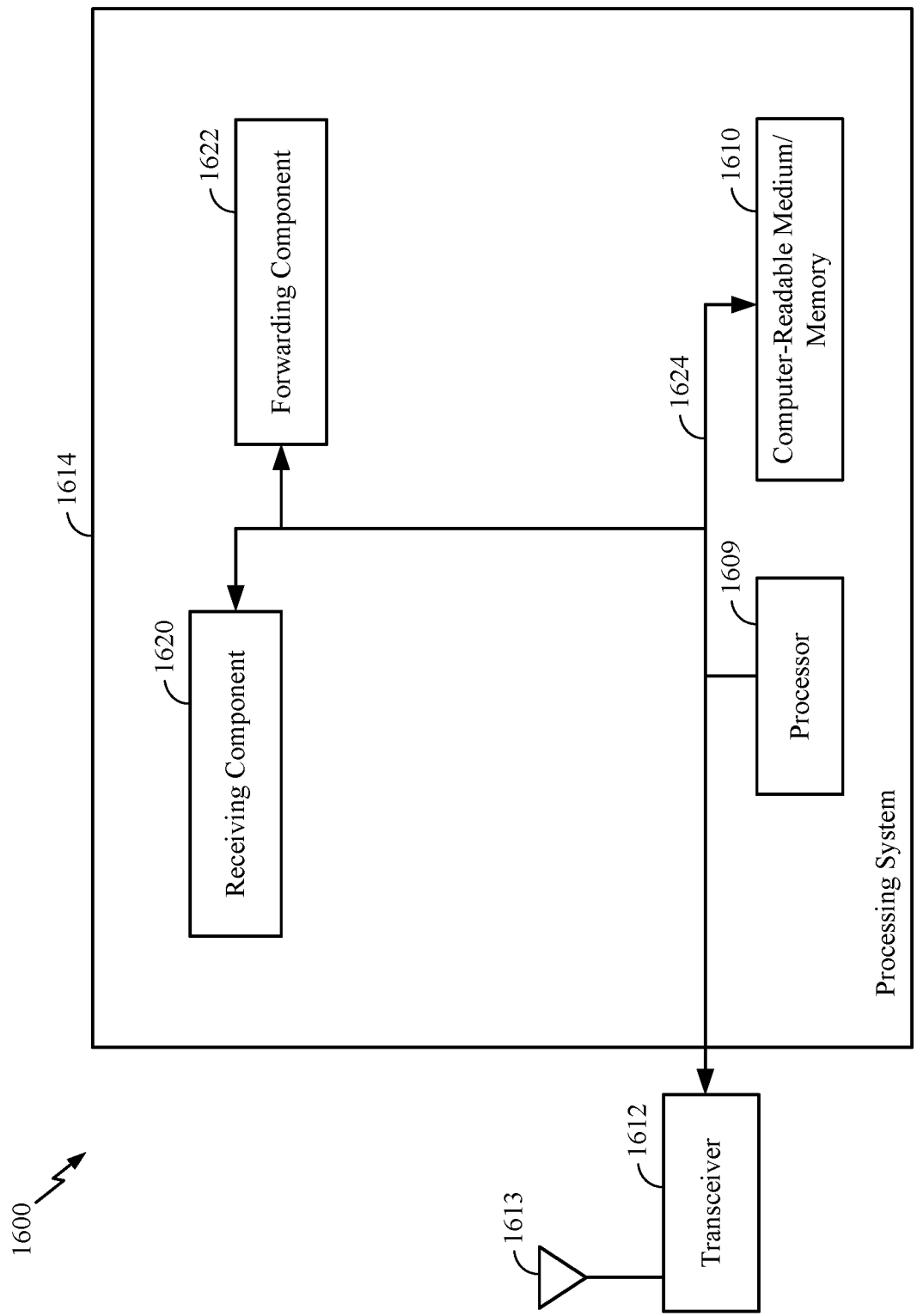
FIG. 16 illustrates a communications device that may include various components configured to perform operations for the techniques disclosed herein, such as one or more of the operations illustrated in FIG. 11.

FIG. 16 illustrates a wireless communications device 1600 (a second UE, such as UE 120, vehicle B of FIG. 12, etc.) that may include various components (e.g., corresponding to means-plus-function components) configured to perform operations for the techniques disclosed herein, such as one or more of the operations illustrated in FIG. 11. The communications device 1600 includes a processing system 1614 coupled to a transceiver 1612. The transceiver 1612 is configured to transmit and receive signals for the communications device 1600 via an antenna 1612. The processing system 1614 may be configured to perform processing functions for the communications device 1600, such as processing signals, etc.

The processing system 1614 includes a processor 1609 coupled to a computer-readable medium/memory 1610 via a bus 1624. In certain aspects, the computer-readable medium/memory 1610 is configured to store instructions that when executed by processor 1609, cause the processor 1609 to perform one or more of the operations illustrated in FIG. 11, or other operations for performing the various techniques discussed herein.

In certain aspects, the processing system 1614 further includes a receiving component 1620 for performing one or more of the operations illustrated at 1102 in FIG. 11. Additionally, the processing system 1614 includes a forwarding component 1622 for performing one or more of the operations illustrated at 1104 in FIG. 11. Additionally, the processing system 1614 includes a transmitting component 1623 for The receiving component 1620 and the forwarding component 1622 may be coupled to the processor 1609 via bus 1624. In certain aspects, the receiving component 1620 and the forwarding component 1622 may be hardware circuits. In certain aspects, the receiving component 1620 the forwarding component 1622 may be software components that are executed and run on processor 1609.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors (e.g., one or more of the various processors shown in FIG. 4 and described above) to perform the operations described herein. For example, instructions for performing the operations described herein and illustrated in FIG. 8, 9, 10, or 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a network entity, comprising:
    receiving a request, from a first user equipment (UE), for sharing of sensor information by at least a second UE based on a target region indicated by the request; and
    taking one or more actions, in response to the request, to trigger the sharing of sensor information by the second UE with the first UE, wherein the one or more actions comprise broadcasting a message in the target region to trigger the sharing of sensor information by the second UE with the first UE.

2. The method of claim 1, wherein:
    the target region indicates one or more cells in which sensor information is requested; and
    broadcasting the message comprises:
        broadcasting the message in the one or more cells to trigger the sharing of sensor information by the second UE.

3. The method of claim 1, wherein:
    the target region indicates a location of the first UE and an area of interest where the first UE has requested information about;
    the one or more actions further comprise locating one or more cells in which sensor information is requested based on the target region; and
    broadcasting the message comprises broadcasting the message in the one or more cells to trigger the sharing of sensor information.

4. The method of claim 1, wherein the request includes one or more criteria relating to at least one of a location of the first UE, sensory information requested by the first UE, an area of interest where the first UE has requested information about, a viewing angle, or a time.

5. The method of claim 1, wherein:
    at least one of a single cell to multipoint (SCTPM), multimedia broadcast multicast services (MBMS) mechanism or a cell broadcast service (CBS) is used for the broadcasting.

6. The method of claim 1, wherein:
    the message is aligned with a broadcast design of a radio access network (RAN) associated with the network entity for the broadcasting.

7. The method of claim 1, wherein:
    the one or more actions further comprise:
        connecting with the second UE in a cell covering at least a portion of the target region, the second UE matching one or more criteria indicated by the message; and
        setting up a connection using a protocol data unit (PDU) session configuration information or packet data network (PDN) connection configuration information of the first UE to allow sensor information generated by the second UE to be locally routed to a PDU session or PDN connection of the first UE, respectively.

8. The method of claim 1, wherein:
    the one or more actions comprise:
        establishing a connection for the sharing of sensor information between the first UE and the second UE, wherein the connection enables sensor information to be transmitted from the second UE to the first UE using an IP address provided by the first UE.

9. The method of claim 8, wherein:
    the request comprises protocol data unit (PDU) session configuration information or packet data network (PDN) connection configuration information; and
    the sensor information being transmitted from the second UE to the first UE is based on the PDU session configuration information or the PDN connection configuration information, respectively.

10. The method of claim 1, wherein the one or more actions comprise:
    modifying a connection of the first UE with the network entity to connect the first UE to the second UE.

11. The method of claim 1, wherein the second UE is an idle UE.

12. The method of claim 1, wherein the one or more actions comprise broadcasting the message in the target region to trigger the sharing of sensor information by the second UE directly with the first UE.

13. A method of wireless communications for use by a first user equipment (UE), comprising:
    transmitting a request to a network entity to request a sharing of sensor information by at least a second UE with the first UE based on a target region indicated by the request; and
    receiving the sensor information from the second UE in response to the request.

14. The method of claim 13, wherein:
    transmitting the request to the network entity comprises transmitting the request to a vehicle-to-everything (V2X) application server; and the request is forwarded by the V2X application server to the network entity.

15. The method of claim 13, wherein the target region indicates a location of the first UE and an area of interest where the first UE has requested information about.

16. The method of claim 13, wherein: transmitting the request to the network entity comprises transmitting the request to the network entity using a multimedia broadcast multicast services (MBMS) mechanism via at least one of an xMB reference point or an MB2 reference point.

17. The method of claim 13, wherein:
transmitting the request to the network entity comprises transmitting the request to the network entity using a cell broadcast service.

18. The method of claim 13, wherein:
the network entity uses a system conforming to 5G technologies; and
transmitting the request to the network entity comprises transmitting the request to the network entity via a network exposure function (NEF) interface.

19. The method of claim 13, wherein the method further comprises:
connecting with the second UE for the sharing of the sensory information based on a protocol data unit (PDU) session or packet data network (PDN) connection configuration information of a PDU session or a PDN connection of the first UE with the network entity, respectively.

20. A method of wireless communications for use by a first user equipment (UE), comprising:
receiving a message from a network entity indicating a request by a second UE for a sharing of sensor information with the second UE, the message comprising one or more criteria;
determining that the first UE is a match for the one or more criteria; and
transmitting sensor information to the second UE based on the one or more criteria.

21. The method of claim 20, further comprising:
initiating a first connection to the network entity after the determining, wherein the first connection is set up with the network entity based on protocol data unit (PDU) session configuration information or packet data network (PDN) connection configuration information of the second UE, and wherein a second connection is established by the network entity for the second UE and the first UE to share sensor information.

22. The method of claim 21, wherein transmitting sensor information to the second UE further comprises transmitting the sensor information to the second UE using the second connection.

23. The method of claim 22, wherein transmitting the sensor information to the second UE using the second connection further comprises transmitting the sensor information to the second UE using an IP address provided by the second UE.

24. The method of claim 22, wherein transmitting the sensor information to the second UE using the second connection further comprises transmitting the sensor information to the second UE using the PDU session configuration information or the PDN connection configuration information of the second UE.

25. The method of claim 20, wherein the message provides a reason for the request, the reason being related to the sharing of sensor information.

26. The method of claim 20, wherein the message indicates one or more criteria relating to at least one of a location of the second UE, sensory information requested by the second UE, an area of interest where the second UE has requested information about, a viewing angle, or a time.

27. An apparatus, comprising:
a non-transitory memory comprising executable instructions; and
a processor in data communication with the memory and configured to execute the instructions to cause the apparatus to perform a method comprising:
receiving a request, from a first user equipment (UE), for sharing of sensor information by at least a second UE based on a target region indicated by the request; and
taking one or more actions, in response to the request, to trigger the sharing of sensor information by the second UE with the first UE, wherein the one or more actions comprise broadcasting a message in the target region to trigger the sharing of sensor information by the second UE with the first UE.

28. The apparatus of claim 27, wherein:
the target region indicates one or more cells in which sensor information is requested; and
broadcasting the message comprises:
broadcasting the message in the one or more cells to trigger the sharing of sensor information by the second UE.

29. The apparatus of claim 27, wherein:
the target region indicates a location of the first UE and an area of interest where the first UE has requested information about;
the one or more actions further comprise locating one or more cells in which sensor information is requested based on the target region; and
broadcasting the message comprises broadcasting the message in the one or more cells to trigger the sharing of sensor information.

30. The apparatus of claim 27, wherein:
the one or more actions further comprise:
connecting with the second UE in a cell covering at least a portion of the target region, the second UE matching one or more criteria indicated by the message; and
setting up a connection using a protocol data unit (PDU) session configuration information or packet data network (PDN) connection configuration information of the first UE to allow sensor information generated by the second UE to be locally routed to a PDU session or PDN connection of the first UE, respectively.

31. The apparatus of claim 27, wherein:
the one or more actions comprise:
establishing a connection for the sharing of sensor information between the first UE and the second UE, wherein the connection enables sensor information to be transmitted from the second UE to the first UE using an IP address provided by the first UE.

32. The apparatus of claim 27, wherein the one or more actions comprise broadcasting the message in the target region to trigger the sharing of sensor information by the second UE directly with the first UE.

33. A first apparatus, comprising:
a non-transitory memory comprising executable instructions; and
a processor in data communication with the memory and configured to execute the instructions to cause the first apparatus to perform a method comprising:

transmitting a request to a network entity to request a sharing of sensor information by at least a second apparatus with the first apparatus based on a target region indicated by the request; and receiving the sensor information from the second apparatus in response to the request.

34. The first apparatus of claim 33, wherein:

transmitting the request to the network entity comprises transmitting the request to a vehicle-to-everything (V2X) application server; and the request is forwarded by the V2X application server to the network entity.

35. The first apparatus of claim 33, wherein the target region indicates a location of the first apparatus and an area of interest where the first apparatus has requested information about.

36. A first apparatus, comprising:

a non-transitory memory comprising executable instructions; and a processor in data communication with the memory and configured to execute the instructions to cause the first apparatus to perform a method comprising:

receiving a message from a network entity indicating a request by a second apparatus for a sharing of sensor information with the second apparatus, the message comprising one or more criteria;

determining that the first apparatus is a match for the one or more criteria; and transmitting sensor information to the second apparatus based on the one or more criteria.

37. The first apparatus of claim 36, wherein transmitting sensor information to the second apparatus further comprises transmitting the sensor information to the second apparatus using a connection.

38. The first apparatus of claim 37, wherein transmitting the sensor information to the second apparatus using the connection further comprises transmitting the sensor information to the second apparatus using an IP address provided by the second apparatus.

39. The first apparatus of claim 37, wherein transmitting the sensor information to the second apparatus using the connection further comprises transmitting the sensor information to the second apparatus using protocol data unit (PDU) session configuration information or packet data network (PDN) connection configuration information of the second apparatus.

* * * * *